(Model.)

C. STENGEL.
CASTER.

No. 428,155. Patented May 20, 1890.

Witnesses:
A. C. Rogue
O. W. Kap

Charles Stengel Inventor
by James W. See
Attorney

UNITED STATES PATENT OFFICE.

CHARLES STENGEL, OF HAMILTON, OHIO.

CASTER.

SPECIFICATION forming part of Letters Patent No. 428,155, dated May 20, 1890.

Application filed October 1, 1889. Serial No. 325,649. (Model.)

*To all whom it may concern:*

Be it known that I, CHARLES STENGEL, of Hamilton, Butler county, Ohio, have invented certain new and useful Improvements in Casters, of which the following is a specification.

This invention pertains to furniture-casters, and while some of the features are applicable to one-wheeled casters they have been designed with special reference to that class of casters in which two wheels are employed, the axis of the two wheels being arranged to oscillate with reference to the furniture, so that both wheels may take a fair bearing on the floor.

My improvements will be readily understood from the following description, taken in connection with the accompanying drawings, in which—

Figure 1:
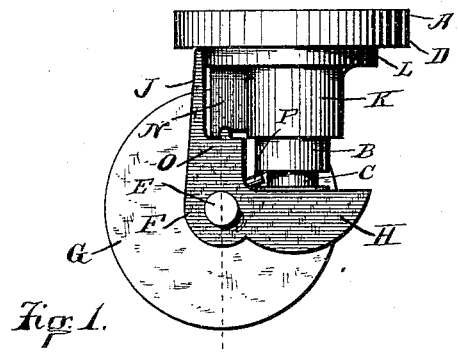
Figure 2:
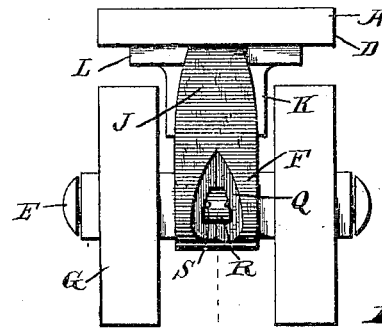
Figure 3:
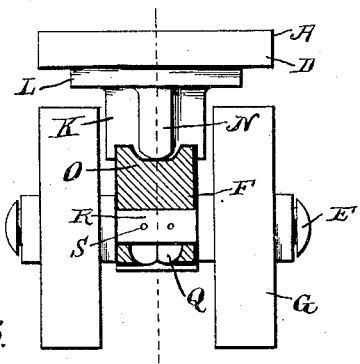
Figure 4:
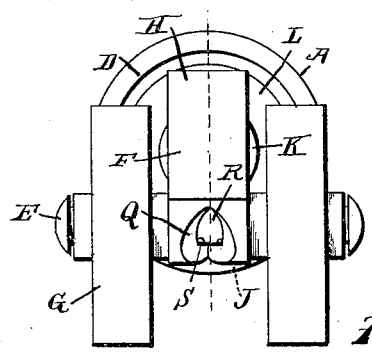
Figure 5:
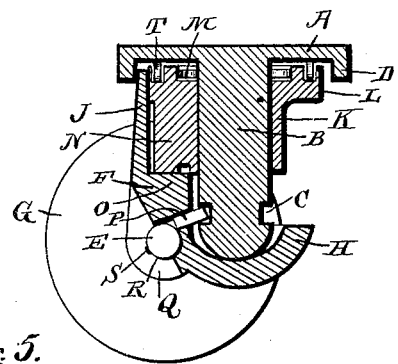

Figure 1 is a side elevation of a caster illustrating my improvements, one wheel of the caster being removed; Fig. 2, a rear elevation of the caster, the rear being that portion to the left in Fig. 1; Fig. 3, a rear elevation similar to Fig. 2, but showing the housing in vertical section in the plane of the axis of the floor-wheels; Fig. 4, a bottom view of the caster; Fig. 5, a vertical section of the caster in a plane coincident with the axis of the stem and at right angles to the axis of the floor-wheels; and Fig. 6, a side elevation of the caster with one wheel removed and shown part in vertical section, illustrating a modification.

In the drawings, (omitting Fig. 6 from consideration,) A indicates the usual caster-plate, which plate is to be arranged in any ordinary manner for attachment to furniture; B, the usual stem formed with or rigidly attached to the plate and projecting downward therefrom to serve as the axis of rotation as the caster swivels; C, a circumferential groove in the stem near its foot; D, a peripheral curtain projecting downward from the plate; E, the axle of the wheels; F, the housing encircling the axle between the wheels; G, the two wheels loose on the axle; H, a horizontal projection of the housing, the same projecting backwardly under and into loose engagement with the foot of the stem; J, a tail-piece rigidly formed with the housing and projecting therefrom upwardly within the curtain of the plate; K, a collar freely journaled on the stem between the housing and plate and having capacity for vertical movements on the stem—that is to say, the collar is free to rotate and to move up and down on the stem; L, a disk-like box formed at the upper end of the collar, the periphery of this box engaging the inner surface of the upper end of the housing-tail, which lies loosely in the annular space formed between the periphery of the box and the inner wall of the plate-curtain, the upper portion of this box being concentrically grooved to receive one or more concentric series of anti-friction rollers; M, a series of anti-friction rollers or disks, with their axes vertical, disposed in an appropriate groove in the collar-box immediately around the stem just under the plate, the rollers bearing inwardly against the stem and outwardly against the wall of the box-groove in which they lie, the lower faces of the rollers lying on the floor of such groove, the rollers being preferably without journals, mere disks, lying flat in their grooves and forming a complete circular series therein, such series of disks, like anti-friction rollers, being old in casters; N, a radial projection from the collar K, this projection reaching rearwardly over the axle and having a rocker-formed lower edge, the axis of the rocker being at right angles to the wheel-axle; O, a rocker-seat formed upon the housing over the axle and forward of the tail-piece and engaging the rocker of the projection N; P, a retaining-pin seated in a hole in the housing and engaging its end with the groove C of the stem, the hole in the housing in which this pin is seated opening rearwardly at the rear of the housing through the hole in which is seated the wheel-axle; Q, an angular notch in the housing, this notch being crossed by the wheel-axle and presenting its two walls at angles to the axis of the wheel-axle; R, that portion of the wheel-axle which becomes exposed where the axle passes through the notch; S, projections outward from the portion R of the axle exposed by the notch, these projections engaging the walls of the notch; T, Fig. 5, an annular series of anti-friction rollers arranged in a concentric groove in the collar-box L, this set of rollers being like the set M, previously referred to, except that the rollers T are arranged with their axes horizontal and bear downwardly on the floor of the box-groove which holds them and upwardly on the under surface of the plate, the diameter of this circle of rollers being preferably such that the axis of the wheel-axle lies in a plane tangential to that circle.

In constructing the caster the axle is passed through one wheel, then through the housing, then through the other wheel, and then riveted. The wheels turn freely on the axle, which should be a non-rotary element; but it has been found quite difficult to secure the axle immovably in the housing, and the result has been that the axle would rotate in the housing and wear loose and get shaky, and that it would also shift endwise in the housing and improperly pinch one of the wheels. I obviate this by means of the notch Q and projections S. After the wheel and axle parts just referred to are assembled I form the projections S by means of a prick-punch or other setting-tool which will raise a swell on the surface of the axle where it crosses the notch. These swells or projections are to be as far apart as the walls of the notch will permit. One swell or projection having the proper horizontal length to engage the two walls will answer as well as the two separate ones. These projections or swells, engaging the walls of the notch, prevent the improper end movement of the axle in the housing, and a very trifling degree of rotation on the part of the axle causes the projections to forcibly engage the converging walls of the notch, whereby further rotation of the axle in the housing is prevented.

Practically the forming of the projections permanently locks the axle to the housing, and at the same time the projections are of such a trifling character that they will not prevent the axle being driven out of the housing in case repairs are to be made. The pin P unites the housing to the stem, and this pin is inserted in its housing-hole before the axle is inserted in the housing. Consequently the axle serves as a keeper for the retaining-pin.

When the caster swivels, the housing turns on the foot of the stem and the housing-tail travels freely around in the groove formed within the curtain of the plate. The downward strains on the housing tend to rotate the housing forward on the axle, or, in other words, to tip the housing over forwardly. This tendency is resisted by the tail J coming in contact with the periphery of the collar-box L. When the furniture is pushed backward at the instant before the caster swivels, there is a tendency of the housing to tip over backward, and this tendency is resisted by the housing-tail coming in contact with the plate-curtain.

Figure 6:
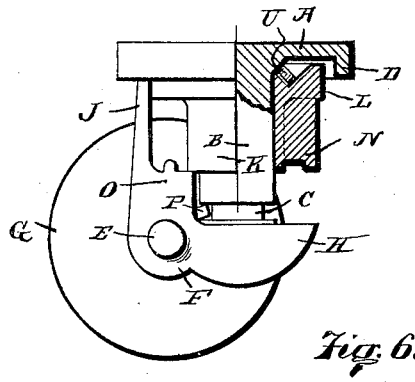

The housing-tail will at most times of course impinge against the collar-box, and in the act of swiveling the collar revolves on the stem, the collar and housing-tail moving together. The side pressure between stem and collar produced by the pressure of housing-tail would cause friction, which would interfere with the freedom of swiveling. This friction can be materially lessened by the use of the anti-friction rollers M, whose only office is to permit the free rotation of the collar structure on the stem. The function of the collar structure as thus far described is to furnish a disk-like stop or rest for the housing-tail and to furnish a simple and efficient box for containing anti-friction rollers. In the performance of such offices the collar structure is subjected to no vertical strains, and it is only necessary that provision be made for holding the collar up upon the stem. Any retaining feature upon stem or housing engaging below the collar structure will serve this purpose. Nothing simpler or more efficient can be found, it is thought, than the housing portion O engaging under the collar structure, the only office of such engagement as thus far described being to prevent the dropping of the collar structure. The engagement may take place at any point under the collar structure. The collar structure has a rocker N, if desired, and as hereinafter explained, and Fig. 1 represents the collar structure vertically supported by the housing engaging under this rocker; but for the performance described the rocker is not essential. Fig. 6 illustrates the housing feature O as engaging directly under the collar. The collar has been revolved until the rocker N is at the front—a position in which it performs no office, the conditions being such that the rocker N might be entirely omitted.

The wheel-axle in the two-wheeled casters should be capable of oscillation with reference to the stem. The housing rocks, as usual, on the foot of the stem, and as this oscillation takes place the housing-tail oscillates through a segment of the groove formed within the plate-curtain. The housing-tail bears forcibly against the collar-box, and, instead of the tail sliding along the surface of the collar-box, the collar-box moves rotarily, thus permitting the oscillating motion to take place with the minimum of frictional resistance. Under the conditions thus far referred to—conditions under which the collar is free from vertical strains—the entire load is borne at the foot of the stem; but, if desired, the vertical strains may be imposed upon the collar through the medium of the rocker N. In such case the rocking takes place at the collar, as well as at the foot of the stem, and during the movement of the oscillation the collar structure partakes of a slight rotation. This imposing of vertical strains on the collar structure causes the collar structure to impinge against the lower surface of the plate, and the friction which would result may be materially lessened by the employment of the rollers T, some of which rollers will at all times lie vertically over the axle and serve in supporting the major portions of the load. The vertical strains will thus be in a direct vertical line from the plate down through the rearward ones of the rollers T, thence through the rocker, and thence to the axle—conditions under which there will be but slight tipping tendencies on the part of the housing, thereby greatly lessening the force with which the housing-tail engages the plate-curtain or collar-box. The side friction being thus reduced to a minimum, the rollers M are not so important, and may be omitted.

The employment of anti-friction rollers in casters is quite common in the art, and my improved construction contemplates the employment of any of the well-recognized types of anti-friction elements in the collar-box. Anti-friction rollers have been set vertically and again horizontally and again diagonally, and again spherical rollers have been employed. The collar-box construction lends itself to any of these rollers.

Fig. 6 illustrates the application of diagonal rollers U to the collar-box, such rollers serving virtually to relieve the friction due to vertical strains and side strains.

It will be observed that if the rocker N be absent the collar structure bears no vertical strains, and the entire strain and motion of oscillation is at the foot of the stem, which in such case becomes a foot-step bearing. This will be understood by inspecting Fig. 6, in which the rocker N is virtually suppressed. In this case the connection at the foot of the stem must perform two offices: first, the uniting of the stem to the housing, and, second, the furnishing of a foot-step bearing of oscillation. When, however, the vertical strains are taken by the collar and rocker, as in the other figures of the drawings, the rocker itself furnishes the bearing of oscillation, and the office of the foot of the stem may be limited to that of effecting a union between the stem and the housing to prevent the separation of the parts. This union must, of course, be a free one, so as to permit, without improper restriction, the necessary motion of oscillation.

I claim as my invention—

1. In a caster, the combination, substantially as set forth, of a stem, one or more floor-wheels, a housing having a hole for a wheel-axle and a notch intersecting the axle-hole, and a wheel-axle seated in said axle-hole in the housing and crossing said notch and provided with projections engaging the walls of the notch.

2. In a caster, the combination, substantially as set forth, of a stem, one or more floor-wheels, a housing having an axle-hole and an angularly-walled notch intersecting the axle-hole, and a wheel-axle seated in said axle-hole in the housing and crossing said notch and provided with projections engaging the angular walls of the notch.

3. In a caster, the combination, substantially as set forth, of a stem, a collar journaled thereon and provided with a disk or circular box at its top, a housing engaging the stem and fitted to swivel thereon and engaging below said collar to prevent the descent of the collar, a tail projecting upwardly from the housing and engaging the periphery of said collar-disk, an axle carried by the housing, and one or more floor-wheels on said axle.

4. In a caster, the combination, substantially as set forth, of a stem, a plate thereto provided with a peripheral curtain, a collar loose on the stem and provided with a disk or circular box disposed within and concentric to said curtain, so as to form a downwardly-open annular groove at the top of the caster, a housing engaging the stem, a tail projecting from the housing upwardly into said annular groove, an axle carried by the housing, and one or more floor-wheels on the axles.

5. In a caster, the combination, substantially as set forth, of a stem, a housing engaging the stem, an axle carried by the housing, one or more floor-wheels on the axle, a collar journaled on the stem above the housing and engaged by the housing and provided at its top with one or more annular grooves, and anti-friction rolls disposed in such groove or grooves.

6. In a caster, the combination, substantially as set forth, of a stem provided with a plate, a housing engaging the stem and having a rocker-seat, an axle carried by the housing directly below and at right angles to said rocker-seat, floor-wheels on the axle, a collar loose on the stem between the housing and plate and having a rocker engaging said rocker-seat, and having at its top an annular groove, to which the plane of the axle is tangent, and rollers in said groove.

CHARLES STENGEL.

Witnesses:
J. W. SEE,
A. C. ROGERS.